June 11, 1963  D. W. DANIEL  3,092,934
METHOD AND APPARATUS FOR FINISHING GEARS
Filed July 1, 1960

INVENTOR.
DAVID W. DANIEL
BY Whittemore
Hulbert & Belknap
ATTORNEYS

United States Patent Office 3,092,934
Patented June 11, 1963

3,092,934
METHOD AND APPARATUS FOR FINISHING GEARS
David W. Daniel, Detroit, Mich., assignor to National Broach & Machine Company, Detroit, Mich., a corporation of Michigan
Filed July 1, 1960, Ser. No. 40,447
16 Claims. (Cl. 51—105)

The present invention relates to method and apparatus for honing gears.

This application is a continuation-in-part of my prior copending application Serial No. 661,727, filed May 27, 1957, now abandoned.

It is an object of the present invention to provide a novel method and apparatus for predetermining the radial pressure existing between a work gear and a gear-like honing tool.

More specifically, it is an object of the present invention to provide a method and apparatus for providing a substantially constant force urging radial approach between a work gear and a gear-like honing tool, while opposing a substantially constant and substantially greater resistance to separation between the gear and tool.

More specifically, it is an object of the present invention to provide apparatus for predetermining the forces urging radial approach and opposing radial separation between a meshed work gear and gear-like honing tool which comprises non-positive means for applying a substantially constant force tending to urge radial approach between the gear and tool, and non-positive means equally opposing radial approach and separation between the gear and honing tool.

It is a further object of the present invention to provide apparatus as described in the preceding paragraph in which the non-positive means for applying a substantially constant force urging approach between the work gear and honing tool comprises a fluid cylinder.

It is a further object of the present invention to provide apparatus as described in the preceding two paragraphs in which the non-positive means opposing separation between the work gear and honing tool is a friction device.

Other objects and features of the invention will become apparent as the description proceeds, especially when taken in conjunction with the accompanying drawing, illustrating a preferred embodiment of the invention, wherein.

Figure 1:
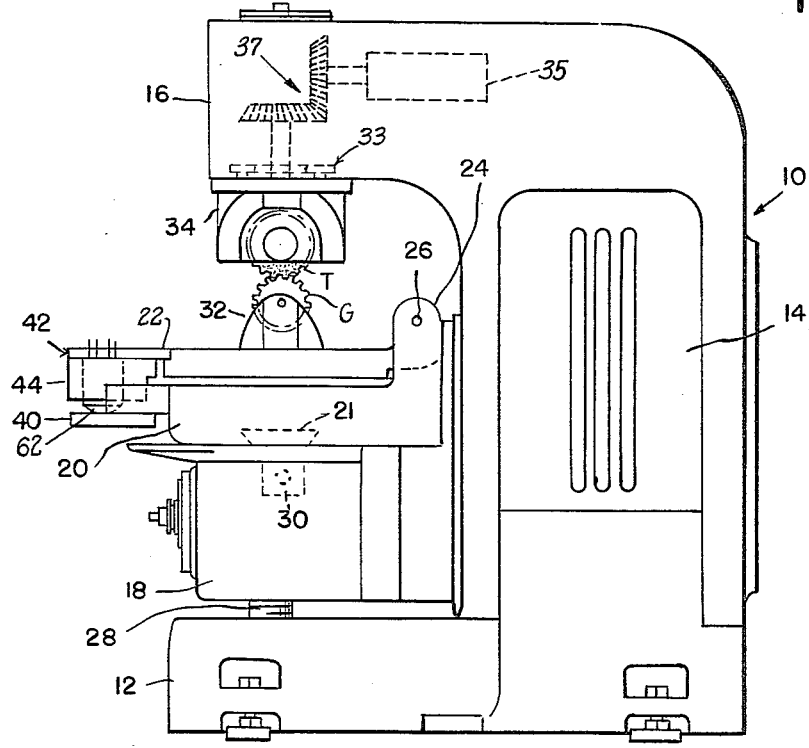
FIGURE 1 is a side elevational view of a gear honing machine.

The present invention relates to gear honing which is an operation designed particularly for finishing the teeth of work gears after they have been hardened, as for example by heat treatment. The operation is carried out by rolling a work gear in mesh with a gear-like honing tool with the teeth of the gear and honing tool in pressure contact. The axes of the gear and honing tool are preferably crossed in space at a small angle and the honing operation includes the provision of a slow relative traverse between the gear and hone in a direction which occupies a plane parallel to the axes of both the gear and hone. The honing tool is characterized in that at least its toothed peripheral portion is formed of a resin compound which includes a multiplicity of separate abrasive particles embedded therein. The resin compound is quite hard but is slightly yieldable and highly resilient. If properly used, the honing tool may operate to finish many thousands of work gears. However, since its toothed peripheral portion is formed of a resin compound, it is subject to breakage and accordingly, it is an essential feature of the honing operation to provide a very accurate control of the forces acting between the teeth of the gear and hone.

In the preferred honing operation, the work gear and the honing tool are operated in tight mesh while subjected to forces urging continuous radial approach between the gear and hone. It will be appreciated that this operation inherently results in a wedging action between the teeth of the gear and hone, and accordingly, the forces acting between the gear and hone have to be very accurately controlled.

One factor which is taken into account in accordance with the present invention is the fact that in finishing a series of work gears, one of the errors present in the work gears which will be encountered is eccentricity. Accordingly, as the work gear and hone are rotated in mesh, the eccentricity of the work gear will tend to produce a relative radial movement in approach and separation between the work gear and hone. If a constant radial force is applied which tends to produce radial approach but to oppose radial separation only with the same force, then it will be apparent that the honing operation will have little if any tendency to correct eccentricity.

In order to correct eccentricity in work gears, it has in the past been proposed to provide means effective to move the hone and work gear into tight mesh under a predetermined relatively small pressure, as for example that produced by a total radial force acting between the gear and hone of less than 100 pounds. With the gear and hone in tight mesh as outlined above, locking means were actuated to prevent further relative radial movement between the gear and hone. It will be appreciated that if the hone initially contacted the gear at its high side, taking into account its eccentricity, then when the gear has rotated 180 degrees the teeth of the gear and hone will have moved into loose mesh or at least into negligible pressure contact, depending of course upon the amount of eccentricity of the work gear. On the other hand, if it so happened that the work gear and tool were brought into mesh with the honing tool in contact with the low side of the work gear and thereupon locked against further relative radial movement, rotation of the work gear through 180 degrees to bring its high side into mesh with the hone would produce a very substantial increase in pressure between the teeth of the gear and hone. In some cases, due to the slight yieldability of the material of the hone, this was not objectionable and in fact, had the result of quickly removing the eccentricity. However, depending upon the amount of eccentricity, it subjected the hone to dangerous pressures and in some cases resulted in damage to the teeth of the hone.

In accordance with the present invention, the gear and hone are urged together continuously with a predetermined substantially constant rlatively small force. However, this force is a non-positive force which may be overcome as for example by eccentricity of the work gear, so that relative radial separation may ocur between the work gear and gear honing tool. However, when relative radial separation between the work gear and hone occurs, it is reuired to overcome a substantially constant resistance to relative radial separation which is substantially greater than the force urging radial approach between the gear and gear honing tool.

Referring now to the drawings, there is shown a gear honing machine comprising a frame 10 including a base 12, a column 14 and an overhanging tool support head 16.

Mounted on the base 12 is a knee 18 which is vertically movable on ways provided at the front of the column 14. At its top the knee 18 carries a slide 20 which is mounted for horizontal reciprocation on the knee, suitable ways diagrammatically indicated at 21 being provided for this purpose. Carried by the slide 20 is a tilting work support table or platform 22 which is pivoted to posts 24 on the slide 20 by pivot means indicated at 26.

Means are provided for effecting veritcal movement of the knee 18, this means comprising a feed screw and nut combination, a portion of the feed screw being indicated at 28. Means are provided for effecting a relatively slow traverse of the slide 20 relative to the knee 18 and this means is diagrammatically indicated as comprising a feed screw and nut combination 30.

The tilt table 22 includes head and tail stocks, one of which is indicated at 32, between which is mounted the work gear G.

At the underside of the head 16 is a tool support housing 34 which is angularly adjustable as for example by a circular T-slot means diagrammatically indicated at 33 about a vertical axis to determine the crossed axes setting between the work gear G and a gear-like honing tool T. A motor 35 included in the head 16 is connected by suitable gearing 37 to drive the tool T in rotation. A detailed disclosure of a tool drive of this type is shown in FIGURE 7 of Drummond Patent 2,270,422. The work gear G is freely rotatable and is driven in rotation solely by the meshed engagement between the teeth of the honing tool T and the work gear G.

Figure 2:
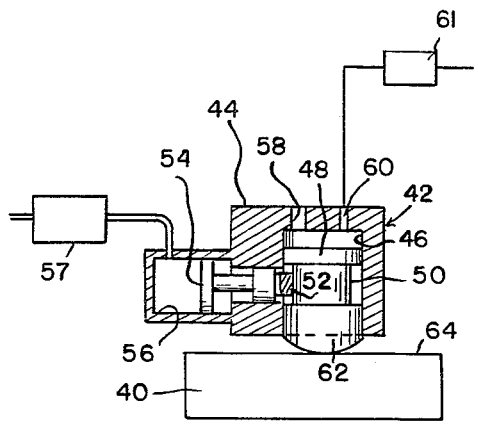
FIGURE 2 is an enlarged sectional view through the work biasing mechanism.

Means are provided for determining with considerable accuracy the actual forces tending to cause radial approach between the gear G and the tool T. This means is indicated in FIGURE 1 but is shown in greater detail in FIGURE 2. The slide 20 is provided with a forward extension 40 and the tilt table 22 is provided with a fluid actuated biasing device indicated generally at 42. This device comprises a block 44 having a cylinder 46 therein which receives a piston 48. The piston includes an intermediate reduced portion 50 which is engaged by a friction shoe 52 connected to an actuating piston 54 received in a cylinder 56. The pressure of fluid supplied to the cylinder 56 may be controlled by a pressure regulating valve 57 to regulate the effectiveness of the brake shoe 52 in opposing movement of the piston 48.

Fluid under pressure is admitted to the cylinder 46 above the piston 48 through ports 58 and 60. The port 58 may be for the purpose of providing relatively large flow in supplying or exhausting fluid, but the pressure of the fluid in the cylinder acting on the piston 48 is preferably admitted through the smaller port 60 and is controlled by a pressure regulating valve 61. The lower end of the piston 48 includes a head 62, the lower surface of which is rounded and rests upon the upper surface 64 of the extension 40.

It will thus be seen that the tilt table 22 is urged upwardly about its pivot axis 26 with a constant force which is determined by the pressure of fluid in the cylinder 46. However, the total force acting between the gear G and the tool T tending to produce radial approach therebetween is modified by the action of the friction shoe 52 which engages the intermediate reduced portion 50 of the piston. The friction opposing vertical movement of the piston is of course controlled by controlling the pressure of actuating fluid admitted to the cylinder 56.

From the foregoing it will be observed that apparatus has been provided which is effective to produce a substantially constant non-positive force urging radial approach between the gear G and the tool T, and effective to oppose separation between the gear and tool with a substantially constant and substantially greater force. By way of a specific example, assume that the friction shoe 52 is effective to require a force of 40 pounds on the piston 48 to cause movement against the frictional resistance. If fluid is admitted to the cylinder 46 at a pressure sufficient to overbalance the weight of the tilt table 22 and to produce an excess force of 40 pounds acting on the piston 48, it will be appreciated that this 40 pounds will produce no movement because it is just sufficient to equal the frictional opposition to movement of the piston in the cylinder. If however, the pressure of fluid in the cylinder 46 is increased to produce a force which exceeds the force necessary to counterbalance the weight of the tilt table by 80 pounds, then the extra 40 pounds of force is available to produce a controlled and predetermined radial pressure between the gear G and the tool T. Having in mind the fact that the table 22 is pivoted at the point 26 and that the axis of the piston 48 is located somewhat more than twice the distance from the pivot as the gear G, this excess 40 pounds of force will produce something in excess of 80 pounds actual radial pressure existing between the gear G and tool T.

However, with the aforesaid assumed conditions operative it will be apparent that if, due to eccentricity of the gear, downward movement of the tilt table 22 is produced, the forces existing between the gear and tool and acting radially thereof, will be the forces required to overcome both the frictional resistance to motion of the piston 48 in the cylinder and the pressure of the fluid in the cylinder 46. In the assumed case there is thus a requirement of 120 pounds between the piston 48 and the forward extension 40 of the slide. This in turn will require a force somewhat in excess of 240 pounds acting radially between the teeth of the gear G and the tool T.

The foregoing numerical examples are for illustration only. Actually, the relative values of friction and fluid pressure may be varied and controlled as desired. However, the important consideration is that the apparatus and method involves the application of a substantially greater constant force to produce separation between the gear and tool than is available to produce approach therebetween. The application of frictional resistance is constant and operates to reduce the effectiveness of a predetermined fluid pressure in the cylinder to cause approach between the gear and tool. However, the frictional resistance acts in conjunction with the fluid pressure to oppose separation between the gear and tool.

As a result of the foregoing the development of dangerous pressures between the gear honing tool and an eccentric gear is prevented. At the same time, since substantially greater forces are developed as the gear and tool are caused to move apart, the operation tends to remove eccentricity of a work gear in a very efficient manner.

The drawings and the foregoing specification constitute a description of the improved method and apparatus for finishing gears in such full, clear, concise and exact terms as to enable any person skilled in the art to practice the invention, the scope of which is indicated by the appended claims.

What I claim as my invention is:

1. The method of honing a work gear which comprises rotating the gear in tight mesh with a gear-like honing tool, applying a substantially constant force acting between the gear and tool in a direction to urge radial approach therebetween, and opposing radial separation between said gear and tool with a substantially constant force substantially greater than the force urging radial approach therebetween effective to reduce eccentricity in a work gear due to removal of additional material during relative separating movement between the centers of the gear and tool.

2. The method of honing a work gear which comprises rotating the gear in tight mesh with a gear-like honing tool with their axes of rotation crossed in space, applying a substantially constant force acting between the gear and tool in a direction to urge radial approach therebetween, and opposing radial separation between said gear and tool with a substantially constant force substantially greater than the force urging radial approach therebetween effective to reduce eccentricity in a work gear due to removal of additional material during relative separating movement between the centers of the gear and tool.

3. The method of honing a work gear which comprises rotating the gear in tight mesh with a gear-like honing tool, relatively traversing said gear and tool in a direction which occupies a plane parallel to their axes of rotation, applying a substantially constant force acting between the gear and tool in a direction to urge radial approach therebetween, and opposing radial separation between said gear and tool with a substantially constant force substantially greater than the force urging radial approach therebetween effective to reduce eccentricity in a work gear due to removal of additional material during relative separating movement between the centers of the gear and tool.

4. The method of honing a work gear which comprises rotating the gear in tight mesh with a gear-like honing tool, relatively traversing said gear and tool in a direction parallel to the axis of rotation of said gear, applying a substantially constant force acting between the gear and tool in a direction to urge radial approach therebetween, and opposing radial separation between said gear and tool with a substantially constant force substantially greater than the force urging radial approach therebetween effective to reduce eccentricity in a work gear due to removal of additional material during relative separating movement between the centers of the gear and tool.

5. The method of honing a work gear which comprises rotating the gear in tight mesh with a gear-like honing tool, opposing relative movement between said gear and tool in the direction of a line joining their axes by a substantial frictional force, and applying a yieldable, substantially constant force acting between said gear and tool to urge radial approach therebetween thereby establishing an increased force acting directly between the gear and tool during relative separating movement between the centers thereof effective to reduce eccentricity in a work gear.

6. A gear finishing machine comprising a frame, a rotary work support, means mounting said work support on said frame, a rotary tool support, means mounting said tool support on said frame, means mounting one of said supports for movement toward and away from the other, means for driving one of said supports in rotation, non-positive means connected between said frame and said movable support to apply a substantially constant force urging said movable support toward the other, and adjustable friction means connected between said frame and said support to oppose movement of said movable support toward and away from said other support.

7. A gear finishing machine comprising a frame, a rotary work support, means mounting said work support on said frame, a rotary tool support, means mounting said tool support on said frame, means mounting one of said supports for movement toward and away from the other, means for driving one of said supports in rotation, non-positive fluid piston and cylinder means connected between said frame and said movable support to apply a substantially constant force urging said movable support toward the other, and adjustable friction means connected between said frame and said support to oppose movement of said movable support toward and away from said other support.

8. A gear finishing machine comprising a frame, a rotary work support, means mounting said work support on said frame, a rotary tool support, means mounting said tool support on said frame, means mounting one of said supports for movement toward and away from the other, means for driving one of said supports in rotation, non-positive fluid piston and cylinder means connected between said frame and said one support to apply a substantially constant force urging said one support toward the other, and friction means connected between said frame and said support to oppose movement of said one support toward and away from said other support, said friction means comprising a friction shoe and adjustable means for controlling the pressure of said shoe.

9. A gear finishing machine comprising a frame, a rotary work support, means mounting said work support on said frame, a rotary tool support, means mounting said tool support on said frame, means mounting one of said supports for movement toward and away from the other, means for driving one of said supports in rotation, non-positive fluid piston and cylinder means connected between said frame and said one support to apply a substantially constant force urging said one support toward the other, and friction means connected between said frame and said support to oppose movement of said one support toward and away from said other support, said friction means comprising a friction shoe and adjustable fluid pressure means for controlling the pressure of said shoe.

10. In a gear finishing machine comprising a pair of rotary supports, means mounting one of said supports for movement toward and away from the other, fluid pressure actuated means connected to one of said supports to provide a substantially constant force urging it toward the other of said supports, and adjustable friction means to oppose movement of said one support both toward and away from said other support.

11. In a gear finishing machine comprising a pair of rotary supports, means mounting one of said supports for movement toward and away from the other, fluid pressure actuated means connected to one of said supports to provide a substantially constant force urging it toward the other of said supports, adjustable friction means to oppose movement of said one support both toward and away from said other support, said fluid pressure actuated means comprising a piston and cylinder device, and means for regulating the pressure of fluid supplied to said device.

12. In a gear finishing machine comprising a pair of rotary supports, means mounting one of said supports for movement toward and away from the other, fluid pressure actuated means connected to one of said supports to provide a substantially constant force urging it toward the other of said supports, adjustable friction means to oppose movement of said one support both toward and away from said other support, said fluid pressure actuated means comprising a piston and cylinder device, and means for regulating the pressure of fluid supplied to said device, said friction means comprising a friction shoe engaged with a part movable with the piston of said device.

13. In a gear finishing machine comprising a pair of rotary supports, means mounting one of said supports for movement toward and away from the other, fluid pressure actuated means connected to one of said supports to provide a substantially constant force urging it toward the other of said supports, adjustable friction means to oppose movement of said one support both toward and away from said other support, said fluid pressure actuated means comprising a piston and cylinder device, means for regulating the pressure of fluid supplied to said device, said friction means comprising a friction shoe engaged with a part movable with the piston of said device, and adjustable means for regulating the pressure between said shoe and said part.

14. A gear finishing machine comprising a frame, a rotary work support, means mounting said work support on said frame, a rotary tool support, means mounting said tool support on said frame, means for driving one of said supports in rotation, means mounting one of said supports for adjustment relative to the other angularly about an axis perpendicular to the axes of rotation of said supports, means for effecting relative traverse between said supports in a direction which occupies a plane substantially parallel to the axes of rotation of both of said supports, support structure on which one of said rotary supports is mounted, a pivot mounting between said support structure and said frame located to produce swinging movement of said one rotary support in a direction substantially toward and away from the other rotary support, means connected to said support structure to apply to said support structure a substantially constant force urging said support structure in a direction to cause the rotary support carried thereby to approach said other rotary support, and friction means interconnected between said frame and said support structure at a point remote from said pivot means to oppose swinging movement of said support structure in both directions.

15. Apparatus as defined in claim 14 in which said support structure comprises a platform having opposed edges, said pivot means being located at one of said edges, said other rotary support being located intermediate said edges, and said friction means being located adjacent the other edge of said platform.

16. Apparatus as defined in claim 14 in which said friction means comprises a friction shoe and means for adjusting the operating pressure of said shoe.

References Cited in the file of this patent
UNITED STATES PATENTS

| | | |
|---|---|---|
| 2,627,141 | Praeg | Feb. 3, 1953 |
| 2,885,830 | Watt | May 12, 1959 |